United States Patent [19]
Freeman

[11] Patent Number: 5,625,759
[45] Date of Patent: Apr. 29, 1997

[54] REAL-TIME VIDEO AND ANIMATION PLAYBACK PROCESS

[75] Inventor: Kyle G. Freeman, Woodland Hills, Calif.

[73] Assignee: NovaLogic, Inc., Calabasas, Calif.

[21] Appl. No.: 436,592

[22] Filed: May 8, 1995

[51] Int. Cl.$^6$ ............................................ H04N 1/41
[52] U.S. Cl. ..................... 395/114; 348/384; 358/539; 382/166
[58] Field of Search ....................... 395/114; 348/384; 358/539; 382/166

[56] References Cited

U.S. PATENT DOCUMENTS

| | | |
|---|---|---|
| 4,319,267 | 3/1982 | Mitsuya et al. . |
| 4,580,134 | 4/1986 | Campbell et al. . |
| 4,743,959 | 5/1988 | Frederiksen . |
| 4,797,729 | 1/1989 | Tsai . |
| 4,816,901 | 3/1989 | Music et al. . |
| 4,857,991 | 8/1989 | Music et al. . |
| 4,965,754 | 10/1990 | Stansfield et al. . |
| 4,965,845 | 10/1990 | Chan et al. . |
| 5,046,119 | 9/1991 | Hoffert et al. ........................... 382/166 |
| 5,285,275 | 2/1994 | Abe ........................................ 348/384 |
| 5,301,241 | 4/1994 | Kirk ........................................ 382/166 |
| 5,355,447 | 10/1994 | Knowlton .............................. 395/139 |
| 5,408,542 | 4/1995 | Callahan ................................ 382/56 |
| 5,544,286 | 8/1996 | Laney .................................... 395/114 |
| 5,585,944 | 12/1996 | Rodriguez ............................. 382/166 |

*Primary Examiner*—Melvin Marcelo
*Attorney, Agent, or Firm*—Fulwider Patton Lee & Utecht, LLP

[57] ABSTRACT

Color video data is compressed by storing only the most frequently occurring colors in a block of pixel data. A minimum number of colors for the block is determined by consolidating comparatively close colors. Two comparatively close colors are consolidated by substituting the more frequently occurring color for the less frequently occurring color in the block. Colors are comparatively close when the difference in their color values is less than a color threshold value. The color threshold value can be set by the user. If the minimum number of colors determined for the block is greater than four, then the color thresholds are adjusted and a new minimum number of colors is then determined. The pixel data of the block are stored in accordance with the minimum number of colors determined for that block. Greater compression is achieved when a lower minimum number of colors is determined for the block.

17 Claims, 6 Drawing Sheets

| COLOR | OCCURRENCES | AFTER 1$^{ST}$ COMPRESSION | AFTER 2$^{ND}$ COMPRESSION |
|---|---|---|---|
| A | 4 | 6 | 8 |
| B | 3 | 5 | 8 |
| C | 2 | 2 | – |
| D | 2 | 2 | – |
| E | 2 | – | – |
| F | 2 | – | – |
| G | 1 | 1 | – |
| TOTAL: | 16 | 16 | 16 |

7 COLORS
```
A A A E
A F C E
F C G B
D D B B
```

5 COLORS
```
A A A B
A A C B
A C G B
D D B B
```

2 COLORS
```
A A A B
A A A B
A A B B
B B B B
```

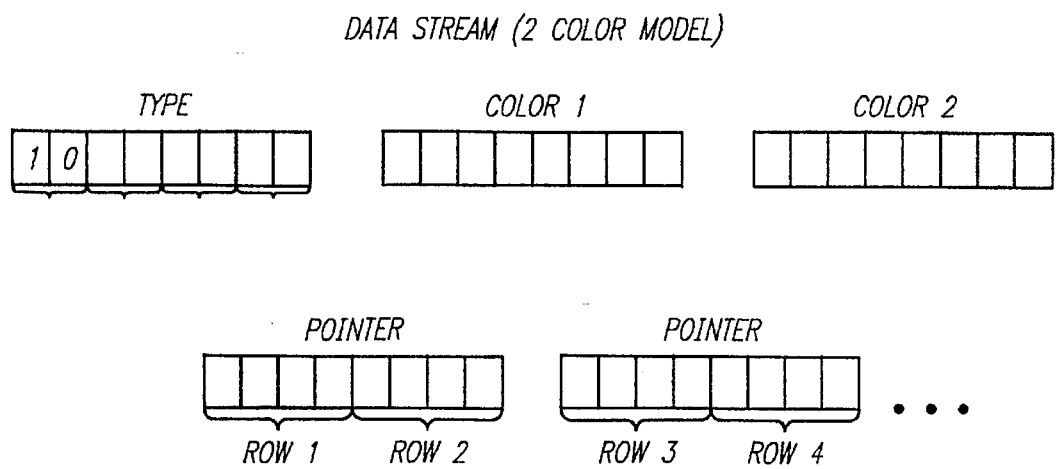

FIG. 6

| COLOR | OCCURRENCES IN BLOCK | | |
|---|---|---|---|
| | PREVIOUS FRAME | CURRENT FRAME | AFTER COMPARING PIXELS |
| N | 4 | 3 | 0 |
| P | 3 | 1 | 0 |
| R | 3 | 7 | 3 |
| S | 3 | 5 | 2 |
| T | 3 | 2 | 0 |

```
P P S N          Ⓟ S Ⓢ Ⓝ          0 S 0 0
P S N T          S Ⓢ Ⓝ Ⓣ          S 0 0 0
S N T R          Ⓢ R Ⓣ Ⓡ          0 R 0 0
N T R R          R R Ⓡ Ⓡ          R R 0 0
```

PREVIOUS BLOCK     CURRENT BLOCK     PIXELS STORED AFTER COMPARISON

with points $C_0(R_0, G_0, B_0)$ and $C_1(R_1, G_1, B_1)$ in RGB space.

FIG. 8

RAM 22 — µP 21 — I/O 35 — MONITOR 40 — CD-ROM 30 — µP 121 — COLOR MONITOR 140 — RAM 122

REAL-TIME VIDEO AND ANIMATION PLAYBACK PROCESS

BACKGROUND OF THE INVENTION

This invention relates generally to compressing color video data and, more specifically, to varying the degree of compression as a function of the color characteristics of the video data being compressed.

Color video animations or videotapes of images or scenes can be used to enhance the realism and/or usefulness of computer generated displays and graphics. These video images are typically stored as a stream of digital color video data on a storage device such as a CD-ROM disk in a retreivable format. When desired by the viewer, or when directed by the software program, the color video data representing the video image is retrieved from the storage device and diplayed on a display device, such as a video monitor. In practice, the video data is not displayed continuously, but is divided into a series of frames. Each frame of video data comprises the necessary information to display a single sceeen, or "snapshot" of the video on the display device. Displaying a sequential series of frames in rapid succession can create the illusion of moving pictures.

The quality and realism of the displayed image is a function of the resolution of the display device and the number of colors that the display device is capable of displaying. Typically, reasonable image resolution can be achieved with a display device that displays an image where the image consists of 480 horizontal lines of 640 pixels, or picture elements, per line, although images suitable for some video games may be displayed on devices having resolutions as low as 240 horizontal lines of 320 pixels. Recently, higher resolution display devices capable of displaying 1024 lines of 1280 pixels per line have become commonly available. Where only a simple, two-tone monochrome image is desired, each pixel can be represented by a single bit of video data, since the pixel is either illuminated or dark, depending on the image. Typically, however, monochrome images are displayed using eight bits of data to represent each pixel, allowing each pixel of the image to be displayed in one of a possible 256 shades of a single color. Images displayed in color are much more exciting and visually pleasing than monochrome images, especially when used to enhance the realism of video games and simulations. Substantially more information in the form of digital video color data, however, is required to reproduce color images. In the simplest case, at least three times as much digital data must be used to define a color to be displayed by an individual pixel, since each color consists of a combination of the primary colors red, blue and green, and each of these colors must be defined by digital data. Current display devices, using the RGB (red-blue-green) format are capable of providing as many as 16,777,216 colors by using 24 bits of color video data to define each pixel.

Where relatively static images are to be displayed, the amount of color video data required is not a critical factor in the performance of the software program. However, where a video animation or moving image is desired, the video will appear jerky, unnatural and unrealistic if the video data is not displayed at a rate of at least 30 frames per second, the NTSC television standard. A single video clip lasting one minute must thus be composed of at least 1800 frames of video color data. This enormous amount of video color data must be stored on and retrieved from a CD-ROM or other device having enough storage space to hold all the video color data for the video clip.

A further problem is that storage devices such as CD-ROMs have limited data transfer rates, typically a maximum of about 600,000 bits per second. Where the data cannot be retrieved and displayed rapidly enough, the formation of the video image may stall momentarily while the color video data is being transferred from the storage device to the display device, and detracts from the the realisim of the displayed video images. In order to increase the effective speed of such storage devices and decrease the wait time for generating a moving color video display, numerous compression and decompression techniques to reduce the amount of color video data that must be stored and retrieved have been proposed. Some compression techniques divide a picture or image into a matrix of blocks, each of which is in turn divided into a matrix of picture elements or pixels. The picture or image can be converted into digital data which can then be used to generate a video display of the original picture, wherein certain information must be encoded for every pixel of every block. The amount of data required per pixel and the quality in detail of the picture that can be generated from the data are important characteristics of any compression system. In some instances, the data is compressed in a uniform manner block-by-block or frame-by-frame. In this way, m bits of compressed data are used to represent each n×n block of pixel data. Other systems utilize an adaptive compression method wherein color video data is examined block-by-block, and the type of compression to be used is then determined for each block. In one known system, two diverse colors for each block are determined by averaging the colors that are above and below the mean luminance for the block. These two computed colors may then be compared to a threshold value in order to determine the number of colors to be stored for the block.

What is needed in the art is a method of compressing color video data so that the recreated video image accurately reflects the colors of the original video image while reducing the amount of data necessary so as to produce moving color images in real time from storage devices having a fixed data rate. By reducing the amount of color data necessary for a frame of video, the color data for producing the image can be accessed from the storage device without lagging behind the video display.

SUMMARY OF THE INVENTION

The present invention is directed towards a method for compressing color video data for storage using the colors of the original video image.

In an embodiment of the invention, the method of compressing color video data comprises the steps of dividing a color video frame into blocks of color video data; determining the colors present in a block; calculating a minimum number of colors necessary for the block according to a color threshold; and storing the color video data in the block in accordance with the minimum number of colors necessary for the block, wherein the minimum number of colors is less than or equal to a predetermined number.

The minimum number of colors necessary for the block can be calculated by sorting the determined colors present in the block by frequency of occurrence of each color; comparing each of the determined colors to each other determined color; ascertaining comparatively close colors from the comparison of each determined color in accordance with the color threshold; and substituting the more frequently occurring color for the less frequently occurring color of two comparatively close colors.

If the calculated minimum number of colors is greater than four, then the color threshold can be adjusted and the minimum number of colors necessary for the block can be recalculated accordingly.

The step of determining the colors present in the block can further include the step of comparing the colors present in the block with the colors in a corresponding block in a previous color video frame, wherein the color is given a zero value if the difference between the colors present in the block and the colors in the corresponding block is less than a transparent threshold value.

When reading data from storage devices having a fixed data rate, full motion video images can appear jerky and unnatural where the frame contains more video data than can be read at the fixed data rate given the time allotted for displaying the frame. In order to achieve smooth playback of moving video images, the amount of data being read from storage devices such as a CD-ROM should be decreased so as to allow the processor to capture a sufficient amount of the color video data to reproduce full motion video in real time.

In addition, in even high density storage devices, there is still a practical limit to the amount of data that can be stored. Compression of color video data can allow an increased number of video frames to be stored, thereby increasing the playing time of the device.

BRIEF DESCRIPTION OF THE DRAWINGS

FIG. 1 is a diagram illustrating a data stream format used for the compressed data for two colors in accordance with an embodiment of the invention.

FIG. 2 is a list of the two bit words of the TYPE byte used to indicate the type of compression or coding in accordance with an embodiment of the invention.

FIG. 6 illustrates yet another color queue and corresponding block of pixel data being coded in accordance with an embodiment of the invention.

FIG. 7 is a diagram illustrating the method used to determine the closeness of colors in RGB space.

FIG. 8 illustrates a computer system for coding and decoding color video data in accordance with an embodiment of the invention.

DETAILED DESCRIPTION OF PREFERRED EMBODIMENT

Figure 3A:
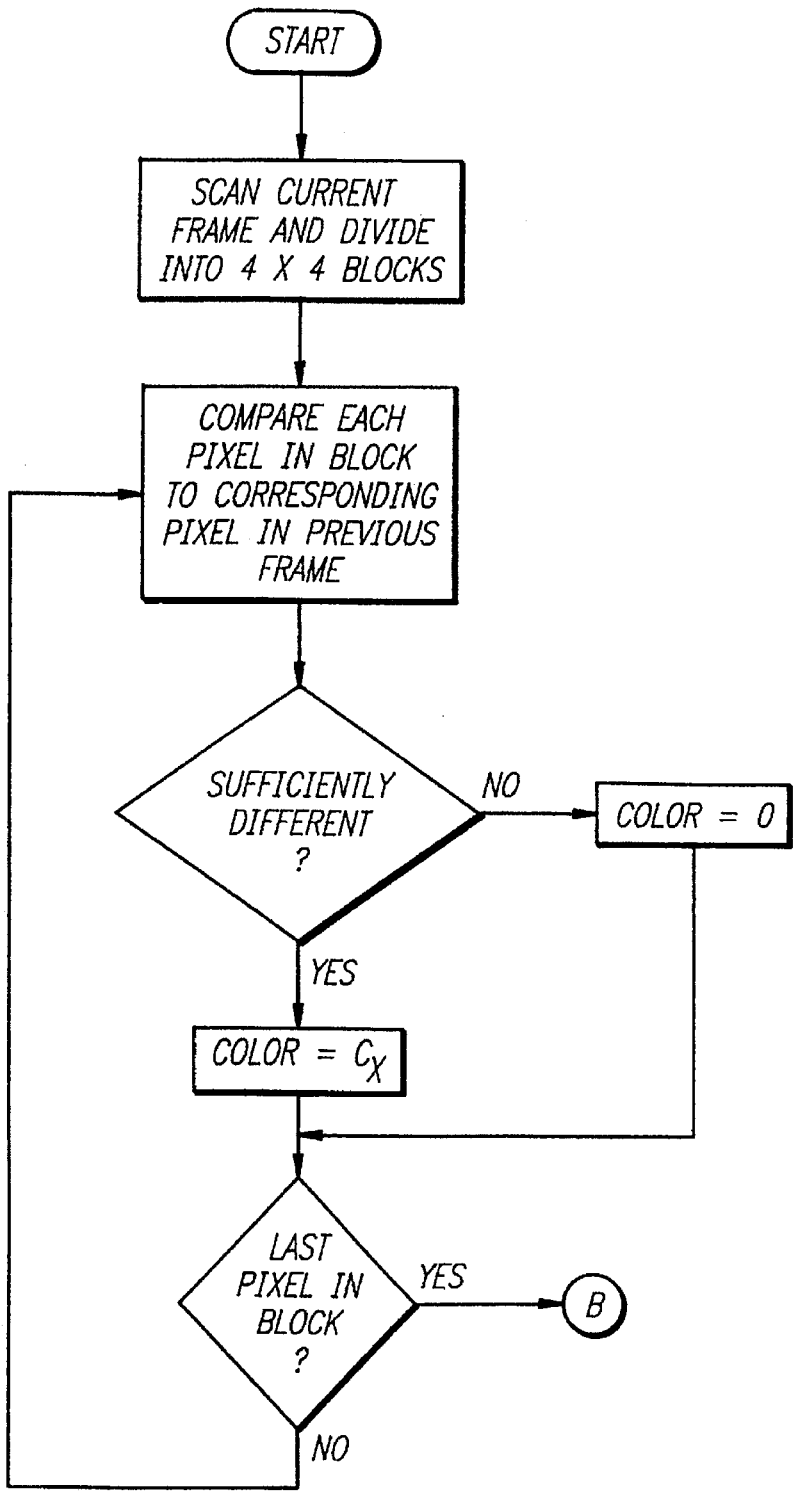
FIGS. 3a–3c are flow charts describing and outlining the compression method in accordance with an embodiment of the invention.

The invention relates to a method for compressing color video data representing frames of color video images to reduce the amount of data stored for each frame and to increase the speed at which such video images can be retrieved and displayed. As described herein, reference will be made to numerous specific details, such as the specific number of bits in a data stream, the number of pixels in a block, etc., in order to more fully describe the invention. However, it should be clear to one skilled in the art that the present invention is not limited to the specific details.

In the present invention, a stream of video data is divided into a sequence of video frames, with each frame comprising video data for displaying a plurality of pixels, with each pixel having an associated color, to display a single display screen or "snapshot" of a color video to be displayed during operation of a computer program. Each frame is scanned and then divided into a matrix of pixel blocks. Each block contains a matrix of pixels, wherein a 4×4 pixel block contains sixteen pixels. Each pixel can be addressed to represent a different color. Thus, a specific color can be assigned for each pixel in the block. The color data in the pixel blocks will then be stored and compressed in a data stream. From this point onward, the terms compressing and coding will refer to the method by which the color video data is stored in the data stream.

FIG. 1 depicts a data stream of color video data compressed in accordance with the present invention. In this example, the data stream includes data for two colors. The first byte of the data stream is called the TYPE byte. This byte has eight bits, which are divided into four two-bit words. By dividing the first or lead byte in this manner, the processor is informed of the color scheme used for the next four pixel blocks, and can manipulate the data accordingly. Each block is preferably a 4×4 pixel block for a total of 16 pixels in a block.

Following the TYPE byte are the COLOR bytes, which are used to identify the colors of the pixels within the pixel block. Each COLOR byte has eight bits. The COLOR byte can therefore address up to $2^8$ or 256 colors on a color map stored in memory. The coding and decoding of color video data will be performed in accordance with this color map memory. During decoding, the memory addresses identify the desired colors for the various pixels, and the data specifying the colors are read out with the corresponding memory locations. Each color includes the R, G and B component values for a video display. In a 24 bit display, an RGB triplet is used having three color maps corresponding to the R, G and B component values, respectively. Specifically, 8 bits will represent the color red (R), 8 bits will represent the color green (G), and 8 bits will represent the color blue (B). Thus, the RGB triplet will be the equivalent of a 768 bit map (i.e., 3×256). Each color of the 256 color map can be indexed onto the RGB triplet, and each color value to be stored has an R, G and B component value. In this way, each COLOR byte can address its own color map. The difference between color values will be determined based upon these RGB component values, as will be discussed in greater detail in connection with FIG. 7.

In the data stream shown in FIG. 1, only two COLOR bytes are shown for the two color data scheme (TYPE 10). Following the COLOR bytes are two POINTER bytes, with each byte being divided into two four-bit words. This total of four four-bit words addresses the colors for the pixel block. The first word (i.e., Word 1) contains the pointer to the color for the first row (i.e., Row 1) of the 4×4 pixel block, with each bit pointing to either the color 1 or color 2 for the individual pixels in that row. Word 2, Word 3 and Word 4 contain the pointers for Row 2 through Row 4, respectively. Where four colors are required for the block (i.e., TYPE 11), then four bytes will be required for the pixel pointers since each pixel will require a two-bit pointer.

The TYPE byte in the data stream includes four two-bit words which indicate the structure and the number of colors for the coded blocks in that data stream. Four pixel blocks are coded in the data stream identified by the TYPE byte. Each two-bit word signifies the data structure to be used for a pixel block. After the last POINTER byte shown in FIG. 1, another set of COLOR bytes and POINTER bytes can be expected according to the second word of the TYPE byte, and so on.

As shown in FIG. 2, there are preferably four different types of color coding schemes for the present invention. These coding shemes are identified by the two-bit words. TYPE 00 coding indicates that no color data follows in the data stream, so that the blocks will appear transparent in relation to the previous frame, and the colors will remain the same. In TYPE 01 coding, the data stream includes information for one color. In TYPE 10 coding, there will be data for two colors, and for TYPE 11 coding, data for four colors will be found.

Where only three colors are required for the block, TYPE 11 coding (i.e. the four color scheme) can be employed wherein the fourth COLOR byte is unused. The fourth COLOR byte may be empty, or merely contain superfluous color data that will not be referenced by the POINTER bytes. Alternatively, the three colors for the block may be forced into a two color scheme by eliminating the third color. Occasionally, no compression can practically be performed for the block, and a full sixteen COLOR bytes will be required (i.e., one color for each pixel) following the TYPE byte. In this situation, a TYPE 01 byte is used wherein the COLOR byte has an arbitrary value such as zero. This arrangement indicates that sixteen COLOR bytes will be used in the data stream for that 4×4 pixel block (for a total of seventeen bytes). However, in most instances, the number of colors present in a block can be reduced to four or less without significantly degrading the image.

An advantage of these arrangements of storing color data is that if the word in a TYPE byte for a specific block is 00, indicating that no change in color has occurred from the previous frame, then no additional data is necessary for that pixel block, thereby saving at least four bytes. No COLOR byte is used in a TYPE 00 data stream. If only one color is necessary for the block, then only the single COLOR byte is necessary (i.e., TYPE 01), saving three bytes. Where two colors are necessary for the block as shown in the TYPE 10 data stream of FIG. 1, two bytes are saved. Where five or more colors are present in the block, at most only four of those colors will be present in the corresponding TYPE 11 data stream. Color compression is achieved by reducing the number of colors being saved for a block. For example, if two colors are sufficiently similar to one another, then those two colors are considered to be the same color. Only one of those two colors will be used in a TYPE 01 data stream instead of a TYPE 10 data stream. The exact structure of the data stream being stored is dependent upon the number of colors being stored and the size of the blocks of pixel data.

Figure 3B:
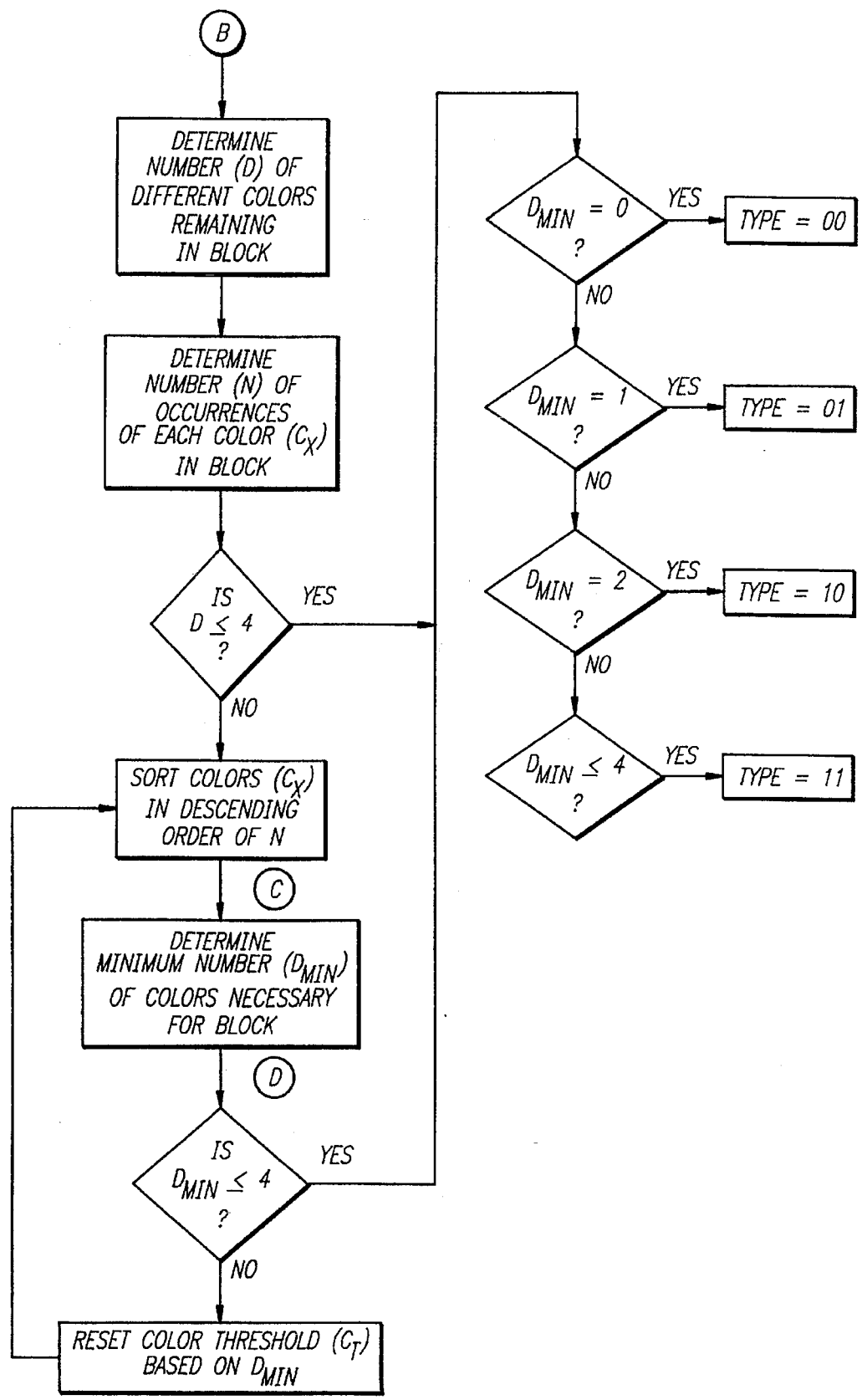
Figure 3C:
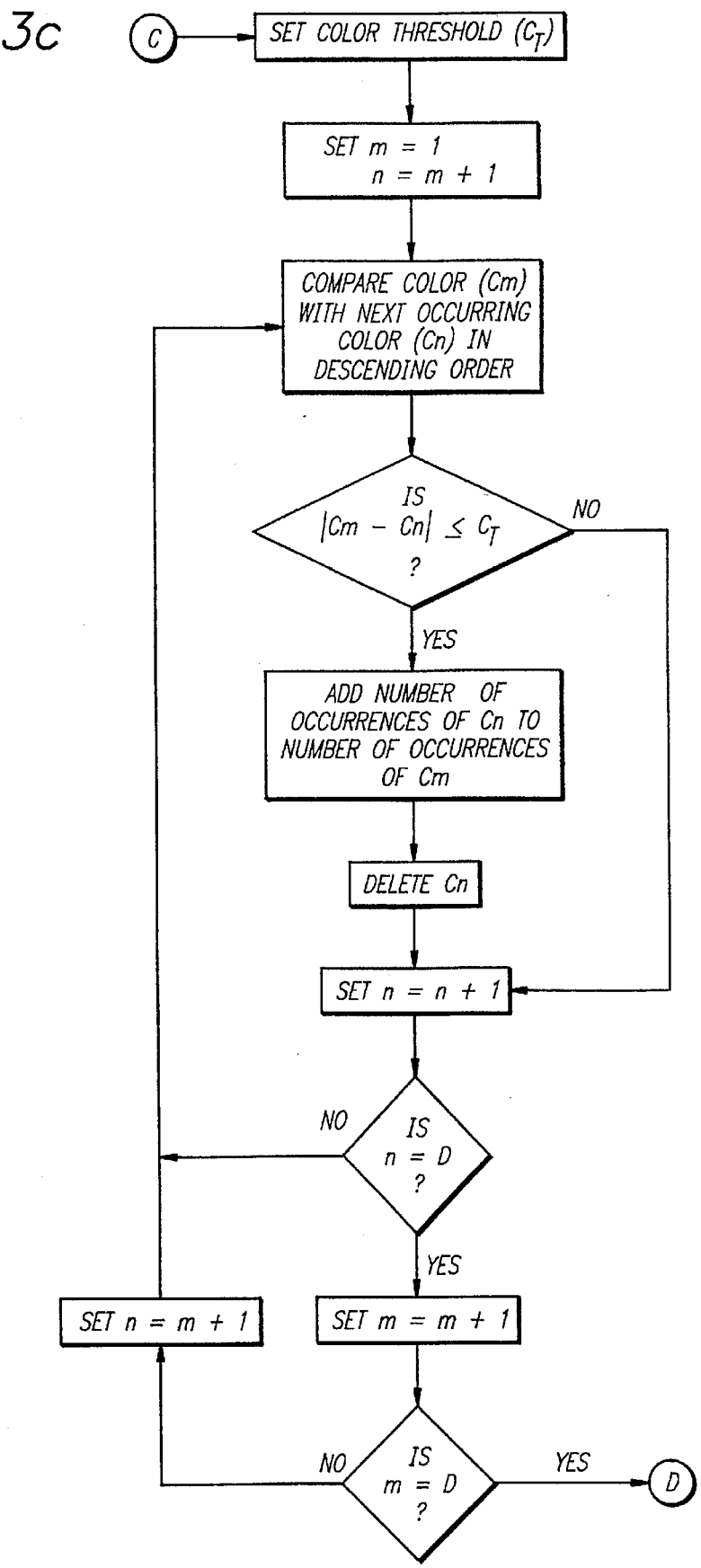

FIGS. 3a–3c show block diagrams of the steps used to determine the type of coding to be used for the blocks of a video image. The colors of the video frame correspond to those present in the 256 color memory map. However, where the video frame to be coded includes colors not identically present in the color video map, then the closest available approximation of the color in the video frame can be used. Each new frame in a succession of frames is scanned and divided into a 4×4 pixel block. The colors of each pixel in each 4×4 block of the video frame are analyzed and then coded in a data stream in accordance with the coding scheme shown in FIG. 2. The analysis and coding of the color video as shown in FIGS. 3a–3c will generally proceed in three stages, wherein the color values are first computed, then sorted according to their frequency of occurrence, and then compared to one another so as to determine the minimum number of colors necessary for coding the block.

In the first stage, as shown in FIG. 3a, color values are determined for each pixel of the block in the current frame. This color value may be determined from the RGB signals for each individual pixel. After the color value for each pixel in the block is determined, each pixel of the block in the current frame is then compared with its corresponding pixel in the previous video frame. If the colors of the corresponding pixels are the same, or if the difference in their color values is less than a transparent threshold value, the color value of that pixel is set at 0. That particular pixel should be "transparent" in relation to the pixel color of the previous frame. This "transparent" color value is considered a color and is counted as such in the coding process to be discussed in greater detail later. If all of the pixels in the block are "transparent", then that block will be subject to TYPE 00 coding. Thus, the use of a "transparent" color value nullifies the need for COLOR bytes in the data stream where all of the pixels of the block are unchanged from the previous frame.

The transparent threshold value for determining the similarity in the colors of corresponding pixels can be either a fixed set value or one selected by the user. The color value of the pixel of the current frame is considered to be "sufficiently different" from the color value of a corresponding pixel of the previous frame where the difference between the color values of the corresponding pixels is greater than the transparent threshold. The "sufficiently different" color value of the current pixel is then stored in the buffer memory, and the next pixel is then analyzed. Each pixel in the block is analyzed in this manner, and a running tally or queue is maintained for the color values ($C_x$) and their corresponding frequency of occurrence (N) within the pixel block.

The second stage of the analysis, as shown in FIG. 3b, begins after each of the 16 pixels in a 4×4 pixel block have been compared to their corresponding pixels in the previous frame. The queue of color values is sorted in descending order of the number or frequency of occurrences for each color. The color value for each color is stored in relation to the frequency of occurrence for that color in the block. These values may be stored by any means known in the art such as a look-up table in memory.

In the third stage of this analysis, shown in FIGS. 3b and 3c, the number (D) of colors currently in the pixel block is reduced to a minimum number ($D_{min}$) of colors necessary for each block of pixels by comparing each color value with every other color value in the queue. The minimum number of colors can be set by the user to one, two, three or four; or can be adaptively determined by a preprogrammed processor. Preferably each color value ($C_m$) is sequentially compared to the other color values ($C_n$), beginning with the most frequently occurring color value. This iterative process, shown in FIG. 3c, determines the minimum number of colors for each block of pixels. Colors are considered to be the same or comparatively close, where the difference in the color value between two pixels is less than a color threshold value ($C_T$). This color threshold value can be fixed or otherwise set by the user, or may be adaptively determined by the system. The compression scheme will result in greater contrast where the color threshold value is set at a higher level. Greater compression can be achieved at the price of higher contrast.

If the less frequently occurring color is determined to be sufficiently close to the more frequently occurring color, as determined by the color threshold value, the count or number of occurrences for the less frequently occurring color is added to the count of the more often occurring color. In this way, the pixels having the less frequently occurring color value are now given the more frequently occurring color value. The less frequently occurring color is then deleted or removed from the queue. This consolidation of comparatively close colors substantially reduces the amount of data needed to be stored for each block. If the two compared colors have a difference in color value greater than the color threshold, the occurrence count for each color is maintained. Preferably, "transparent" colors are never consolidated with a more frequently occurring color. For example, the thresholds and parameters of the system may be set up so that "transparent" colors will always be considered sufficiently different from the other colors.

When each color in the queue has been compared to every other occurring color in the queue, then the type of coding or data storage, representing the effective compression of the color data, is then determined. If all the colors have a "transparent" value of zero, then there has been no significant or appreciable change from the previous frame and TYPE 00 compression is then used. If only one color remains present on the queue, then TYPE 01 compression is used, which requires only one COLOR byte. If two colors remain present on the queue, then TYPE 10 compression requiring two COLOR bytes is used. If three or four colors are present, then TYPE 11 compression is used, requiring four COLOR bytes in the data stream. Where only three colors are present, one of the COLOR bytes will not be referred to by the pixel pointer. This unused byte may be set to a zero value.

As discussed earlier, where three colors remain in a block, instead of allowing one byte to go unused, the three colors of the block may be forced into a two color scheme by eliminating the third color. This would be performed by adjusting the color threshold value, and then comparing the initial colors of the block using the adjusted threshold value to force the new minimum number of colors to two. Of course the color threshold value may also be adjusted to fill out the unused COLOR byte by forcing the process to select the minimum number of colors of four instead of three. In either instance, the minimum colors are selected from the set of actual color values originally determined for each pixel in the block.

If more than four colors remain present on the queue, then the color threshold value is adaptively adjusted by the system based on the number of remaining colors to ensure that no more than four colors remain. The third stage of determining the minimum number of colors is then reiterated using the newly adjusted color threshold values to further consolidate the number of colors remaining in the queue. No new color values are calculated in this process. Only the actual color values originally determined for each pixel in the 4×4 block are coded and stored. The color values for certain pixels are replaced with a comparatively close but more frequently occurring color value. It is by this substitution of color values that color video data is compressed as it is stored along the data stream.

After the number of different colors remaining in the block has been sufficiently reduced, the color data and the corresponding pointer data for the remaining colors are used to encode the data stream. The data stream with the coded color data for the current block is then written to the storage media. This type of storage compression allows a sufficient amount of data to be read from storage devices such as CD-ROMS having a fixed data rate to produce a smooth display of a moving color image in real time.

Figure 4:
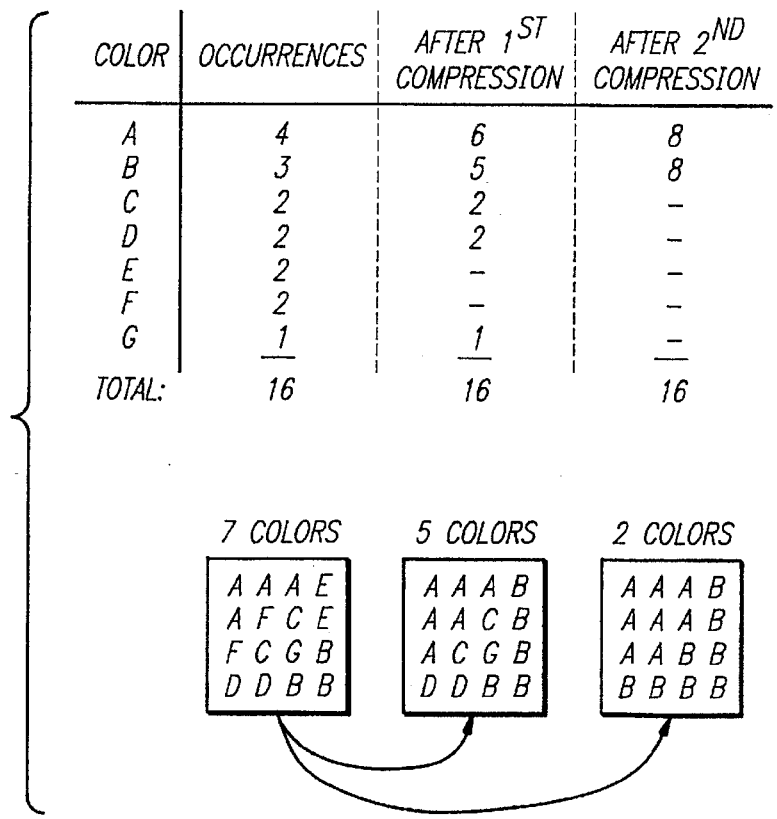
FIG. 4 illustrates a color queue and a corresponding block of color pixels being coded in accordance with an embodiment of the invention.

FIG. 4 illustrates the queue of color values for a 4×4 pixel block. The queue may be in the form of a look up table, or any other means known in the art. The seven color values A through G represent various color values for the pixels in the block, and the corresponding numbers indicate the occurrence count for each color value in the block. The color values A through G generally correspond to the color values ($C_x$) discussed in connection with FIG. 3. As discussed earlier, the color values are sorted in descending order in accordance with the occurrence count for each color value.

In the illustrated example, it is assumed that the seven colors are not transparent, and are different from the colors in the corresponding block of the previous video frame. Color value A is compared with every other color value in the queue in descending order. Color value A is compared with color value B, then color value C, and so on. The process is repeated as color value A is compared with each subsequent color in the queue. In this example, color value A would correspond to color ($C_m$) and color F would correspond to color ($C_n$) in FIG. 3. If color value A is considered to be sufficiently close to color value F, that is, if the difference between their respective color values is less than the color threshold value ($C_T$), then the queue will be updated accordingly. Because color value A occurs four times, while color value F occurs two times, color value F will be collapsed or consolidated with color value A. The queue will record that color value A occurs six times in the block and color value F is removed from the queue. FIG. 4 shows that color value A effectively takes the place of color value F in the pixel block. If no other color is found to be comparatively close to color value A, the next remaining color in descending order is then used. In the illustrative example, color value E is later collapsed into color value B.

After the first compression process, as shown by the pixel blocks in FIG. 4, five colors remain from the initial seven colors. The color threshold value is then adaptively adjusted, preferably by a preprogrammed processor, based on the number of remaining colors in the pixel block. The compression process then begins anew with the adjusted color threshold value. The processor preferably retains the initial color queue in memory so that the initial seven colors of the block are used with the adjusted color threshold value. It is noted that at the end of this second iterative process, only color values A and B remain on the queue, but the number count of occurrences of the colors in the pixel block remains at sixteen. No new colors have been calculated for the block. However, certain color values have been substituted and replaced by preexisting colors in the block. The three pixel blocks shown in FIG. 4 represent the pixel colors in the queue at various levels of compression.

In the illustrative example, only two colors, A and B, remain after this second compression process. These two colors and their respective position pointers for the pixel block are then coded in a TYPE 10 data stream, as previously discussed and shown in FIG. 1, for storage in a CD-ROM or other suitable storage device. This compression and storage technique results in a slightly higher contrast, but still retains several of the original color elements of the image which can be read out of memory to provide a smooth playback from fixed data rate devices. Although some intermediate color shades are lost in the coding process, a series of sequential video images can be compressed and decompressed with a minimal amount of hardware so that the amount of data needed to display each video frame does not exceed the data limit imposed by fixed data rate devices such as a 300 Kb/second CD-ROM. Coding the color video data in this manner provides for the smooth playback of all of the stored frames of video images. The increase in the overall contrast image can be corrected during decompression with a blur filter as data is read from the CD-ROM.

Figure 5:
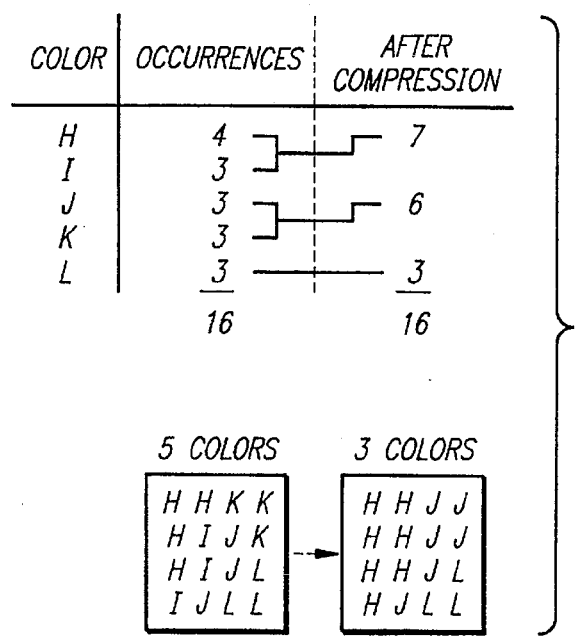
FIG. 5 illustrates another color queue and corresponding block of pixel data being coded in accordance with an embodiment of the invention.

FIG. 5 illustrates the queue of color values for another block. As in FIG. 4, the variable values H through L represent various color values and the corresponding numbers indicate the number of occurrences for each color value in the block. As indicated earlier, the color values are sorted in descending order in accordance with the number of occurrences for each color value. In the second illustrated example, color value H occurs five times, while color value I occurs four times. If color value H is considered to be sufficiently close to color value I in accordance with a color threshold value, the queue will be updated to show that color value H occurs nine times and color value I will be removed from the queue. The process continues, and if no other color is found to be comparatively close to color value H, the next remaining color, which is color value J, would then be used and compared with the remaining colors in descending order.

Should color value J and color value K be found to be comparatively close, one of the color values will be selected and its number of occurrences in the queue will be increased by the number of occurrences of the other color. Because both colors occur the same number of times, a secondary criteria is used to determine which color will remain on the queue. For example, the color value with the higher luminance value may be selected. Alternatively, the colors could be collapsed together where the differences between their respective color values is below another predetermined threshold value. Because the color values are relatively close, the selection of one color over the other should not have a significant impact on the overall image. However, there may be situations where it would be desirable to force the colors to a higher or a lower color value. For illustrative purposes only, the occurrences of color values J and K will be collapsed to color value J. At the end of this iterative process, only color values H, J and L remain on the queue, and the count of color occurrences in the block remains sixteen. These three remaining color values can then coded in a TYPE 11 data stream.

FIG. 6 illustrates a queue of colors for a block containing several colors N, P, R, S and T, some of which are "transparent" with regard to the corresponding block of pixels in the previous video frame. The circled pixel colors are those pixels whose color is the same as in the previous frame. In the pixel block after compression, these reoccurring pixels are left blank with a Ø symbol to represent their "transparent" or zero value. In the illustrated example, the remaining occurrences of the colors N, P and T are at pixel locations corresponding to those in the previous frame. Thus, these three colors effectively disappear as transparent colors, and no specific information regarding the colors N, P and T need be stored for this pixel block. Although colors R and S reoccur at several old pixel locations, these two colors also occur at several new pixel locations as well. Therefore, this pixel block will be coded in a TYPE 11 data stream, albeit no additional colors appear in block, because two colors appear at several pixel locations different from their locations in the previous frame in the block. As noted earlier, the "transparent" colors relative to the previous frame are preferably considered as a separate discrete color. Therefore, TYPE 11 coding and not TYPE 10 coding is required for the pixel block in this instance.

As discussed earlier, the determined color values ($C_x$) can have R, G and B components. FIG. 7 illustrates two color values $C_0$ and $C_1$ in RGB space. The location of the color values in RGB space are thus defined by the R, G and B values of the pixels. In this illustration, color value $C_1$ represents the color value of a pixel in the current frame, and the color value $C_0$ represents the color value of the corresponding pixel in the previous video frame. Of course, this illustration is also applicable to the determination of comparatively close colors as shown in FIG. 3c. The difference or distance between the color values of the pixel can be determined in accordance with the following equation:

$$d = \sqrt{X^2(R_1 - R_0)^2 + Y^2(G_1 - G_0)^2 + Z^2(B_1 - B_0)^2}$$

where X, Y and Z are weighted coefficients which can be adjusted to arrive at varying degrees of closeness between color values as desired. Different values for the coefficients X, Y and Z can be used to give greater or lesser emphasis on a particular color component. Thus, the distance between pixel color values $C_0$ and $C_1$ in RGB space may be used to determine their relative closeness when coding color video data.

The compressive storage technique described above can be used in conjunction with personal computers as shown in FIG. 8. Personal computers such as those incorporating a 486-type or other microprocessor can be used to code and decode the color video data. The microprocessor 21 can store the color values and look-up tables in its random access memory (RAM) 22 as it identifies and counts the colors in a block of pixels. The video data can be provided by an I/O device 35 and viewed on a video monitor 40. The microprocessor 21 then manipulates the data in the RAM 22 in accordance with the coding process as discussed earlier. After the number of different color values in the pixel block have been reduced to less than four, the remaining colors of the pixel block are coded in an appropriate data stream and stored in a high density storage medium such as the CD-ROM 30. The reduced data stream can later be read at the fixed frame rate of the CD-ROM 30 so as to achieve a smooth video playback in real time on the color monitor 140. Any compatible microprocessor 121 with random access memory 122 can decode this data stream from the CD-ROM 30. It is understood that separate or different microprocessors 21 and 121 can be used to code and decode the data stream. Utilizing such hardware in accordance with the teachings of the invention is within the ordinary level of skill found in the art.

While several forms of the invention have been illustrated and described, it will also be apparent that various modifications can be made without departing from the spirit and scope of the invention. Accordingly, it is not intended that the invention be limited except by the appended claims.

I claim:

1. A method of compressing color video data defining color video frames on a display device, the method comprising the steps of:

providing a color video frame comprising a plurality of pixels, each pixel having an associated color;

dividing the color video frame into blocks of pixels;

determining the colors present in one of the blocks;

calculating a number of colors for the block according to a color threshold, the number of colors being no greater than a predetermined number by sorting the determined colors present in the block by frequency of occurrence of each color, comparing each of the determined colors to each other determined color, ascertaining comparatively close colors from the comparison of each determined color according to the color threshold, and substituting the more frequently occurring color for the less frequently occurring color of two comparatively close colors; and storing color video data representative of each pixel in the block in accordance with the number of colors for the block.

2. The method of claim 1, wherein the predetermined number is four.

3. The method of claim 1, wherein the color video frame is divided into 4×4 pixel blocks.

4. The method of claim 1, further comprising the step of:

adjusting the color threshold and recalculating the number of colors for the block, if the calculated number of colors remaining after each of the determined colors is compared is greater than the predetermined number.

5. The method of claim 2 further comprising the step of:

adjusting the color threshold and recalculating the number of colors for the block, if the calculated number of colors remaining after each of the determined colors is compared is three.

6. The method of claim 5, wherein the step of adjusting the color threshold and recalculating the number of colors for the block is performed if the number of colors remaining after each of the determined colors is compared is two.

7. A method of compressing color video data from sequential color video frames, the method comprising the steps of:

providing a color video frame comprising a plurality of pixels, each pixel having an associated color;

dividing the color video frame into blocks of pixels;

comparing the colors present in one of the blocks with the colors in a corresponding block in the previous color video frame;

determining the number of colors present in a block, wherein the number of colors present is zero if the difference between the colors present in the block and the colors in the corresponding block is less than a transparent threshold value;

sorting the colors present in the block by frequency of occurrence of each color;

comparing each of the determined colors to each other determined color;

ascertaining comparatively close colors from the comparison of each determined color in accordance with a color threshold;

substituting the more frequently occurring color for the less frequently occurring color of two comparatively close colors;

adjusting the color threshold and recalculating the number of colors for the block, if the calculated number of colors remaining after each of the determined colors has been compared is greater than a predetermined number; and storing the color video data in the block in accordance with the number of colors for the block.

8. The method of claim 7, wherein the predetermined number is four.

9. The method of claim 7, wherein the color video frame is divided into 4×4 pixel blocks.

10. The method of claim 7, wherein the step of storing comprises the steps of:

assigning a type parameter to the block of pixels, the type determined by the number of colors remaining in the block;

determining the number of color words necessary to define the number of colors remaining from the type parameter;

assigning bit values representative of the colors remaining in the block to the color words;

determining the number of pixel words required by the type parameter;

assigning bit values representative of pointers to particular bit values of the color words to the pixel words;

constructing a data record for the block of pixels comprising a type bit representative of the type parameter followed by the determined number of color words and the number of determined pixel words.

11. The method of claim 8, wherein the step of adjusting the color threshold and recalculating the number of colors for the block is performed if the number of colors remaining after each of the determined colors is compared is performed if the calculated number of colors is three.

12. The method of claim 11, wherein the step of adjusting color threshold and recalculating the number of colors for the block is performed if the calculated number of colors remaining after each of the determined colors is compared is performed is two.

13. A method of compressing color video data representing a color video frame, the method comprising the steps of:

providing a color video frame having a plurality of pixels;

dividing the color video frame into blocks of pixels;

determining the colors present in a block;

calculating a number of colors for the block by:

sorting the colors present in the block by descending frequency of occurrence of each color, comparing each of the determined colors to each other determined color, ascertaining the comparatively close colors from the comparison of each determined color in accordance with a color threshold, and substituting the more frequently occurring color for the less frequently occurring color of two comparatively close colors;

adjusting the color threshold and recalculating the number of colors for the block, if the calculated number of colors is greater than four; and storing the color video data in the block in accordance with the number of colors for the block.

14. The method of claim 13, wherein the color video frame is divided into 4×4 pixel blocks.

15. The method of claim 13, wherein the step of determining the colors present in the block further includes the step of comparing the colors present in the block with the colors in a corresponding block in a previous color video frame, wherein the color is given a zero value if the difference between the colors present in the block and the colors in the corresponding block is less than a transparent threshold value.

16. An apparatus for compressing color video data contained in a block of pixels, the apparatus comprising:

a memory;

a processor for calculating a color value for each pixel in the block, for counting the occurrence of each color value in the block, and for temporarily storing a table including each color value in the block and the number of occurrences for each color value in the memory;

said processor further compares each color value in the table stored in the memory with each other color value in the table stored in the memory, wherein if the difference between two color values is less than a threshold value, then the number of occurrences for the less frequently occurring color value is added to the number of more frequently occurring color values, and the less frequently occurring color value is deleted from said memory so that the more frequently occurring color value replaces the less frequently occurring color value in the block; and means for storing the remaining color values in the block from said memory in accordance with the remaining number of color values in the block.

17. The apparatus of claim 16, wherein the means for storing the color video data is a CD-ROM.

* * * * *